Patented Mar. 15, 1949

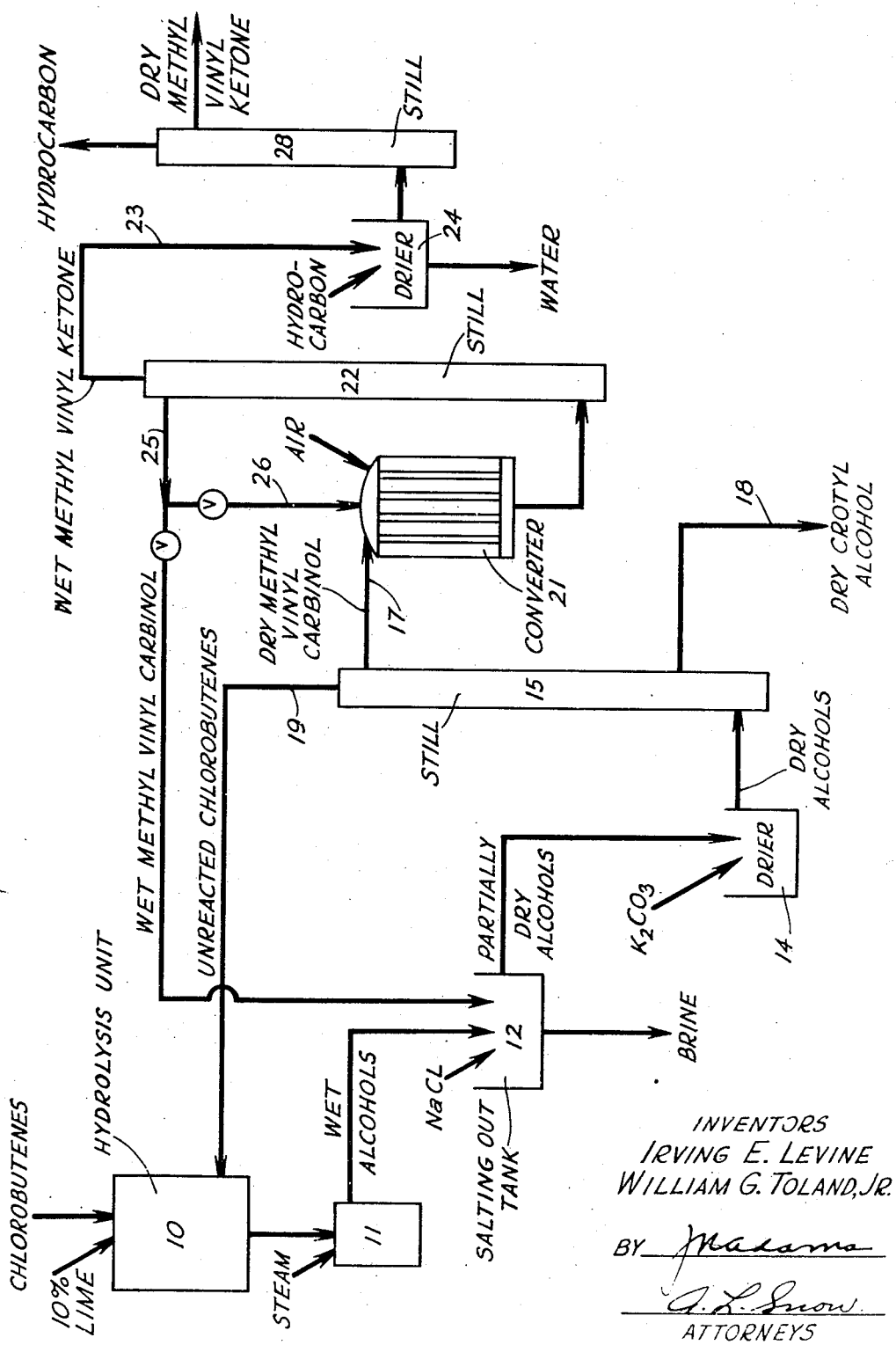

2,464,244

UNITED STATES PATENT OFFICE 2,464,244

PRODUCTION OF METHYL VINYL KETONE

Irving E. Levine and William G. Toland, Jr., Berkeley, Calif., assignors to California Research Corporation, San Francisco, Calif., a corporation of Delaware Application June 19, 1945, Serial No. 600,248

9 Claims. (Cl. 260—593)

The present invention relates to the production of unsaturated ketones, and particularly to the production of alkyl vinyl ketones.

Several methods are available for the production of alkyl vinyl ketones. Two of the most important methods are: (1) the condensation of a ketone with an aldehyde involving dehydration, and (2), the hydration of a vinyl acetylene with water. Methyl vinyl ketone is the most common member in the class of alkyl vinyl ketones, but many difficulties are encountered in its production. Yields of methyl vinyl ketone from the condensation of acetone with formaldehyde are poor. This is a complicated reaction and many side-reactions take place, leading not only to poor yields, but giving a product which is difficult to purify. Methyl vinyl ketone is also produced by the hydration of vinyl acetylene. This method gives better yields, but vinyl acetylene is a relatively expensive starting material and by-products are also a problem in this reaction.

An object of the present invention is to provide a practical process for the production of unsaturated ketones.

Another object of the present invention is to provide a practical process for the production of alkyl vinyl ketones.

A further object of this invention is to provide a process for the production of methyl vinyl ketone utilizing inexpensive, readily obtainable starting materials.

Another object of this invention is to provide a practical process for the production of methyl vinyl ketone which can be easily purified.

Another object of this invention is to provide a process for the manufacture of methyl vinyl ketone from a mixture of monohalobutenes.

Another object of this invention is to provide a process for the vapor phase oxidation of a substantially pure alkyl vinyl carbinol to produce a major proportion of an alkyl vinyl ketone.

Other objects will be obvious to those skilled in the art from the disclosure given.

Figure 1 is a diagrammatic flow-sheet showing a basic method of carrying out the process of this invention, including the three steps of hydrolysis, separation, and oxidation.

The general process of this invention consists of a method for the manufacture of an unsaturated ketone by hydrolyzing appropriate halobutenes to give hydroxybutenes, separating the desired secondary hydroxy butene in a substantially pure state, and oxidizing said secondary hydroxybutene to the corresponding buten-one.

More specifically, this invention deals with the method for the production of an unsaturated ketone by the hydrolysis of either a 4-halo-2-butene or a 3-halo-1-butene or of a mixture of the two halobutenes containing the groups:

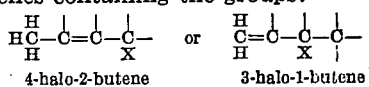

4-halo-2-butene     3-halo-1-butene where X represents a halogen radical, and the unsatisfied valences are taken up by hydrogen or alkyl radicals. Specific examples of halobutenes containing these groups are 4-chloro-2-butene and 3-chloro-1-butene which may be hydrolyzed to give a mixture of the alcohols; 4-hydroxy-2-butene (crotyl alcohol) and 3-hydroxy-1-butene (methyl vinyl carbinol). The methyl vinyl carbinol produced may then be prepared in a substantially pure state by a number of methods especially adapted to this process, such as distillation. Said substantially pure methyl vinyl carbinol may then be oxidized in the vapor phase to methyl vinyl ketone.

Other halobutenes containing these groups include 4-halo-4-methyl-2-butene and 3-halo-4-methyl-1-butene which may be produced from pentadiene 1,3, and 4-halo-4-ethyl-2-butene, 3-halo-4-ethyl-1-butene, and 3-halo-2-methyl-1-butene, etc. These halobutenes may, of course, be produced by any desired method; either chlorobutenes or bromobutenes may be utilized in this process. Mixtures of the above-named halobutenes may be present in any proportion, and minor amounts of impurities such as dihalo derivatives and polyhalo derivatives of the corresponding 1,3 diene may be present in the said mixture. This process is also capable of successfully utilizing a mixture of halobutenes containing excess hydrochloric acid and unreacted diene.

It is a distinct advantage of this invention that either a substantially pure 4-halo-2-butene or a 3-halo-1-butene, or any mixture of said halobutenes, may be utilized for the manufacture of unsaturated ketones. A specific example of a mixture of these halobutenes is 25% to 50% 4-chloro-2-butene and 50% to 75% 3-chloro-1-butene as produced by the hydrochlorination of butadiene 1,3:

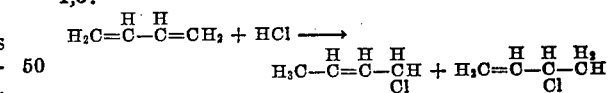

Hydrolysis of the halobutenes is best carried out by means of a sparingly soluble strong base, such as lime, which produces a constant low hydroxyl ion concentration. Calcium carbonate may also be employed, but the evolution of carbon dioxide necessitates special apparatus to recover entrained halobutenes and alcohols, and so is not a preferred method. Caustic is operative but has been found to give poorer yields of the desired alcohols due to excessive dehydrohalogenation of the halobutene. Acid hydrolysis is possible, but gives lower yields of the desired product.

A slurry of between 5% and 25% and especially between 10% and 15% lime is advantageous for the hydrolysis. It has been found preferable to add the halobutene to be hydrolyzed to a vigorously stirred, hot 10% to 15% lime slurry. The lime slurry is maintained at a temperature sufficient to continuously reflux the halobutenes added. Heating with reflux is continued until the temperature of the mass has approximately reached the boiling point of the higher boiling alcohol-water azeotrope. This process usually takes from about 15 minutes to about one hour. A one-mole batch takes approximately one-half hour to completely hydrolyze.

Hydrolysis of these halobutenes is accompanied by rearrangement; either a 4-halo-2-butene or a 3-halo-1-butene, or a mixture of the two halobutenes, will form a readily utilizable equilibrium mixture of about 30% to 50% of a 4-hydroxy-2-butene and 50% to 70% of a 3-hydroxy-1- butene regardless of the proportions of the halobutenes used. It is therefore a distinct advantage of this process that mixtures of halobutenes may be used directly without the necessity of the additional laborious and expensive step of separating the two halobutenes, should they occur in a mixture. It is also, of course, possible, but usually more expensive, to hydrolyze either of the halobutenes in a substantially pure state. Yields of up to 97½% of the hydroxybutenes (mixed alcohols) have been obtained by hydrolysis of halobutenes by the method outlined.

When the halobutenes are substantially completely hydrolyzed, the mixed alcohols are removed from the hydrolysis mixture, preferably by steam distillation.

In order to prepare the hydrolysis mixture for production of the alkyl vinyl ketone, the desired 3-hydroxy-1-butene (alkyl vinyl secondary carbinol) may be separated in a substantially pure state from the mixture of wet alcohols by several special methods. Two general methods of treating the hydrolysis mixture are especially adapted to this particular process. The first method entails drying the mixed alcohols followed by separation of dry, substantially pure alkyl vinyl carbinol, while the second comprises separating wet, substantially pure alkyl vinyl carbinol followed by drying.

When it is desired to separate substantially pure alkyl vinyl secondary carbinol from the steam distilled hydrolysis mixture by the first method, the mixed wet alcohols (4-hydroxy-2-butene and alkyl vinyl secondary carbinol) are first dried, and then separated by distillation, producing the desired product, a dry, substantially pure alkyl vinyl secondary carbinol; and the valuable by-product, a dry, substantially pure 4-hydroxy-2-butene.

The mixed wet alcohols may be dried by either of two general methods, namely, the organic solvent method or the solid desiccant method. In either method, and particularly in the second method, it is frequently advantageous to remove the bulk of the water by "salting out" before carrying out the final drying with the organic solvent or the solid desiccant. Benzene and cyclohexane are organic solvents well adapted to drying these alcohols, but other suitable organic solvents may also be used. A suitable organic solvent must be capable of forming a three-component azeotropic mixture with water and one of the alcohols, and the solvent must have a boiling point sufficiently removed from the boiling point of the desired alkyl vinyl secondary carbinol so that they may be readily separated. Drying of the wet alcohols by the organic solvent method is carried out by adding to the wet alcohols a volume of organic solvent at least sufficient, and preferably in excess of that required, to completely remove the water present as a water-solvent-alkyl vinyl secondary carbinol azeotrope. This wet alcohol-solvent mixture is then subjected to a distillation to remove substantially all the water as a water-solvent-alkyl vinyl carbinol azeotrope leaving a dry alcohol-solvent mixture. The water-solvent-alkyl vinyl secondary carbinol azeotrope may then be settled to remove the water layer, and the alkyl vinyl secondary carbinol and organic solvent may be recovered by distillation, and recirculated in the system.

The removal of water by an organic solvent may be accomplished in a continuous manner if desired. For example, an amount of solvent equivalent to about 10% of that theoretically required to dry the wet alcohols, is added to the still pot and reflux established. The water-solvent-alcohol azeotrope is boiled off, trapped out, and settled. The low water layer is withdrawn, and the upper solvent-alcohol layer is allowed to continuously overflow back into the still pot. This process is continued until all the water has been removed.

The dried alcohols from this organic solvent treatment may then be fractionally distilled to first remove dry, substantially pure alkyl vinyl secondary carbinol, then dry, substantially pure 4-hydroxy-2-butene, and finally dry organic solvent (if an excess has been used) from the dry alcohol-organic solvent mixture. The dry, substantially pure alkyl vinyl secondary carbinol is ready for oxidation, the dry 4-hydroxy-2-butene may be utilized as a by-product as outlined below, and the organic solvent may be recirculated in the drying step of the process.

If it is desired to dry the wet alcohols by the solid desiccant method, it is preferable to first add an inorganic salt and allow the mixture to stratify into two layers. The bulk of the water is thus removed from the mixture in the brine layer, and the organic layer may then be more readily dried by the solid desiccant. While many of the common desiccants may be used, anhydrous potassium carbonate is preferred. Other suitable desiccants include sodium sulfate, calcium sulfate, lime, etc. The dried alcohols are then separated by fractional distillation; dry, substantially pure alkyl vinyl secondary carbinol being removed first, and then dry, substantially pure 4-hydroxy-2-butene.

It is also possible in this process for the production of alkyl vinyl ketones, to produce a substantially pure alkyl vinyl secondary carbinol by subjecting the mixed wet alcohols to an azeotropic distillation, when the boiling points of their respective water azeotropes are sufficiently different, and collecting a wet, substantially pure alkyl vinyl secondary carbinol and a wet, substantially pure 4-hydroxy-2-butene. Said wet, substantially pure alkyl vinyl secondary carbinol may be directly charged to the oxidation unit, or it may be first dried as above. The wet, substantially pure 4-hydroxy-2-butene may be converted to an alkyl vinyl secondary carbinol by isomerization, or it may be recycled to the hydrolysis unit to repress the formation of 4-hydroxy-2-butene in the equilibrium mixture and thereby increase yields of the alkyl vinyl secondary carbinol. It may also be dried and utilized as such, or it may be hydrogenated to produce the corresponding saturated alcohol, or otherwise treated to yield valuable chemical by-products.

The dry, substantially pure alkyl vinyl secondary carbinol (or in special cases the wet, substantially pure alkyl vinyl secondary carbinol) produced by the purification step, is passed to a vapor phase catalytic oxidation unit where very careful control of conditions in exercised to effect successful oxidation of the alkyl vinyl secondary carbinol to the corresponding alkyl vinyl ketone. It is very desirable in this oxidation reaction that oxygen be present in an amount at least equivalent to 90% of that theoretical required to oxidize all the alkyl vinyl carbinol to alkyl vinyl ketone. If substantially less than 90% of oxygen is present, excessive amounts of alkyl vinyl secondary carbinol will undergo rearrangement instead of oxidation. This rearrangement reaction forms the corresponding saturated ketone as shown by the general formula—

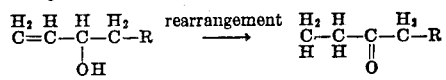

The desired oxidation reaction may be shown by the general formula—

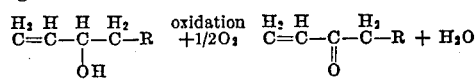

Rearrangement not only decreases the over-all yield of the desired product, but also seriously complicates the purification step because of the small difference in boiling points of the saturated and vinyl ketones. It has been found that oxidation is preferably carried out with an amount of oxygen from about 90% to about 150% of theoretical. An amount of oxygen substantially less than 90% of theoretical gives undue rearrangement, and an amount of oxygen much greater than 150% gives excessive overoxidation of the organic compounds present. An amount of oxygen from about 110% to about 130% of theoretical gives optimum results, the exact amount to be used being dependent on the alkyl vinyl secondary carbinol to be oxidized, temperature, catalyst, space velocity and other specific conditions. Air is conveniently used as a source of oxygen.

Temperature is also a critical factor in obtaining maximum yields in this vapor phase oxidation. Catalyst hot spot temperature must be very accurately controlled, the exact optimum temperature of reaction depending on the particular alkyl vinyl secondary carbinol being oxidized and the catalyst used, as well as the amount of oxygen and inert gases, space velocity of gases, type of oxidation unit, etc. In general, less than 50% of alkyl vinyl secondary carbinol is oxidized to alkyl vinyl ketone below a hot spot temperature of about 425° C. under the conditions of our process. It has also been found that overoxidation reduces yields to about 50% if the hot spot temperature is above about 625° C. The preferred temperature range is between 500° C. and 550° C., depending on the specific conditions. For example, it has been found that maximum conversion of substantially pure, dry methyl vinyl carbinol to methyl vinyl ketone occurs at a hot spot temperature of about 525° C. when air is used in an amount equivalent to approximately 120% of theoretical oxygen with a space rate of about one-half volume of mixed vapors per volume of catalyst per hour, and a copper on pumice catalyst is used. Other specific compounds, of course, have slightly different optimum conditions.

Oxidation of alkyl vinyl carbinol may be carried out in any common type of vapor phase unit such as a mercury or molten salt jacketed catalyst chamber. Sufficiently accurate temperature control is readily possible in this type of unit. It has been found that the composition of the catalyst tubes has an important effect on the oxidation reaction. Copper, glass and aluminum tubes are preferably used. Ferrous metal and brass tubes give inferior results.

Hot vaporized alkyl vinyl secondary carbinol has a tendency to rearrange to the corresponding saturated ketone. This rearrangement can be prevented to a large extent by vaporizing the cold alkyl vinyl secondary carbinol into the oxygen-containing gas in the presence of the catalyst. Under these conditions substantially no rearrangement of alkyl vinyl secondary carbinol takes place before oxidation to alkyl vinyl ketone.

It has been found that an oxidation unit having no cooling bath may be used, under proper conditions, to effect this oxidation with a minimum of rearrangement. For example, a copper unit may be used which is equipped with heating coils to bring the catalyst up to initial reaction temperature. The oxidation reaction being exothermic will then sustain itself at reaction temperature, and the heating coils are not further needed. Ordinarily this exothermic oxidation reaction produces more than enough heat to maintain the catalyst at reaction temperature, and the excess heat may be profitably utilized to vaporize the alkyl vinyl secondary carbinol and to heat the mixed air-alkyl vinyl secondary carbinol to reaction temperature. By properly balancing liquid feed rate and air rate a heat balance may be maintained which will just utilize excess heat of reaction.

Wet alkyl vinyl secondary carbinol may be oxidized directly as noted previously. Presence of water dilutes the reactants and somewhat lowers hot spot temperature, and additional heat must usually be added to maintain reaction. Other conditions, of course, will also be somewhat changed. This method is particularly applicable when the 4-hydroxy-2-butene is isomerized to alkyl vinyl secondary carbinol, which is removed as its water azeotrope; or in the case where the 4-hydroxy-2-butene-water and alkyl vinyl secondary carbinol-water azeotropes are readily separable.

Several common vapor phase oxidation catalysts are suitable for this reaction. A pumice carrier coated with copper or silver is preferable, but other catalysts such as copper gauze, silver on copper, mixed copper and silver on pumice, and similar catalysts are useful. Several catalyst preparations are given by way of example.

To prepare 10% silver-90% copper on pumice use:

| | | |
|---|---|---|
| $Cu(NO_3)_2 \cdot 3H_2O$ | grams | 45.6 |
| $AgNO_3$ | do | 2.0 |
| Distilled $H_2O$ | cc | 50.0 |
| Pumice (9 on 12 mesh) | cc | 100.0 |

The copper and silver nitrates are dissolved in distilled water, then added to pumice in a 250 cc. Erlenmeyer flask. Use a stopper with a short piece of glass tubing as a condenser. This mixture is allowed to reflux from between 3 and 4 hours on the steam plate. Then the excess liquid is filtered off through a Büchner funnel. The pumice is then dried on a steam plate, ignited for 4 hours at about 425° C. and screened to remove fines.

To prepare 10% silver-90% copper on pumice use:

| | |
|---|---|
| $Cu(NO_3)_2 \cdot 3H_2O$ grams | 22.8 |
| $AgNO_3$ do | 1.0 |
| Distilled water cc | 25.0 |
| Pumice (9 on 12 mesh) cc | 50.0 |

The copper and silver nitrates are dissolved in distilled water and added to pumice in an evaporating dish. The mixture is evaporated to dryness on a steam plate with occasional stirring. The dry pumice is then ignited for 4 hours, and screened.

To prepare 10% silver-90% copper on Alundum use:

| | |
|---|---|
| $Cu(NO_3) \cdot 3H_2O$ grams | 45.6 |
| $AgNO_3$ do | 2.0 |
| Distilled water cc | 50.0 |
| Alundum (8 on 10 mesh) cc | 100.0 |

Dissolve the copper and silver nitrates in distilled water and add to the Alundum in a 250 cc. Erlenmeyer flask with a short glass condenser. Reflux on a steam plate for 3½ hours. Filter off excess liquid and dry. Ignite at about 425° C. for 4 hours and screen.

To prepare silver on pumice use:

| | |
|---|---|
| $AgNO_3$ grams | 5 |
| $CH_3COONa$ do | 5 |
| Water cc | 200 |
| Pumice (8 on 12 mesh) cc | 100 |

Dissolve the silver nitrate in water, add pumice, and then with stirring, slowly add the sodium acetate in solution with half the water. Silver acetate is then precipitated on the pumice. The pumice is filtered, dried on steam plate, and ignited at about 300° C. for 2 hours.

To prepare copper gauze catalyst:

A piece of No. 28 mesh copper screen is cut 8″ x 3″ and rolled to fit an 8″ catalyst chamber. The roll is alternately oxidized and reduced with oxygen and then hydrogen to increase the activity of the surface. It is then ready for use.

The alkyl vinyl ketone produced by any of the oxidation methods outlined above is in such a mixture that it may be readily purified. Said mixture contains principally alkyl vinyl ketone, alkyl vinyl secondary carbinol and water. Minor impurities may also be present but do not interfere with the purification process. If purification of the alkyl vinyl ketone is desired, it may be readily accomplished by distillation. It is usually desirable to retain the water in the mixture and separate the alkyl vinyl ketone as its water azeotrope which may then be dried, but under certain conditions it may be preferable to dry the mixture first and then recover the dry alkyl vinyl ketone. If a slight coloration appears and is objectionable, it may be readily removed by washing the alkyl vinyl ketone with a dilute lime solution before drying. This coloration may also be removed by adding iron filings to the impure methyl vinyl ketone in the presence of hydrogen ion, followed by separation of the aforementioned methyl vinyl ketone-water azeotrope. The color bodies will remain behind in the residue.

By carefully controlling conditions, the three-step process of hydrolysis, separation and oxidation gives over-all yields of alkyl vinyl ketone of from 80% to 90% of the theoretical based on the halobutenes used.

The following specific examples, which are given for illustrative purposes only, will describe our invention without limiting it to the precise details set forth:

*Example 1.*—Figure 1 illustrates the first method (e. g., hydrolysis, dehydration, separation and oxidation) as described above. A mixture containing approximately 50% 4-chloro-2-butene and 50% 3-chloro-1-butene with minor amounts of polychloro compounds, such as a mixture produced by the hydrochlorination of butadiene 1,3, is continuously added to the hydrolyzing agent maintained approximately at reflux temperature (65° to 80° C.) in hydrolysis unit 10. A 10% calcium hydroxide slurry is used as the hydrolyzing agent. Vigorous stirring is maintained until the temperature reaches about 85° C. One-half hour is usually sufficient for complete hydrolysis. When hydrolysis of the chlorobutenes is carried out by this method, yields of total alcohols up to 97% of theoretical are obtained. The hydrolysis is accompanied by rearrangement, and the final hydrolysis product contains about 60% methyl vinyl carbinol and about 40% crotyl alcohol, regardless of the original composition of the chlorobutenes used. The methyl vinyl carbinol and crotyl alcohol formed are removed from the hydrolysis mixture in steam distillation unit 11, the process being continued until the temperature reaches about 100° C.

The steam distilled alcoholic mixture is treated with about 1.4 pounds of sodium chloride per gallon of distillate, enough to saturate the water present, in salting out tank 12, to salt out an organic layer which is decanted from the brine layer. The organic layer containing partially dehydrated methyl vinyl carbinol-crotyl alcohol is then transferred to drying unit 14. Solid anhydrous potassium carbonate is added to the organic layer to effect final drying. The dry alcohols are charged to still 15 and are separated by distillation. Substantially pure, dry methyl vinyl carbinol, boiling at about 96.7° C., is removed by line 17, and pure dry crotyl alcohol boiling at about 122.2° C. is removed by line 18. Any unreacted chlorobutenes recovered, may be recirculated via line 19 to hydrolysis unit 10.

The dry, substantially pure methyl vinyl carbinol is vaporized and mixed with an amount of air equivalent to 120% of the oxygen theoretically necessary to oxidize methyl vinyl carbinol to methyl vinyl ketone. The methyl vinyl carbinol-air mixture is passed over a pumice supported copper on silver catalyst in converter 21, said catalyst being contained in a copper lined catalyst tube surrounded by a molten salt bath. A space rate of about one-half volume of vapor per volume of catalyst per hour is used with this catalyst under the given conditions. The hot spot is maintained at about 530° C. for maximum production of methyl vinyl ketone. Under these conditions yields of methyl vinyl ketone from methyl vinyl carbinol of up to 92% of theoretical are obtained.

The impure methyl vinyl ketone produced by one pass through the converter, as outlined above, contains as impurities principally methyl vinyl carbinol and water. Traces of other impurities may also be present, such as acetaldehyde, biacetyl, etc., but these do not interfere with subsequent purification. The impure methyl vinyl ketone is charged to still 22 where pure methyl vinyl ketone is produced from the impure product by separating the methyl vinyl ketone-water azeotrope (boiling point 75.6° C.) from the methyl vinyl carbinol-water azeotrope (boiling point 86.7° C.). The methyl vinyl ketone-water azeotrope is removed by line 23 to drying unit 24. The methyl vinyl carbinol-water azeotrope is recirculated through valve controlled line 25 to salting out tank 12. The wet methyl vinyl carbinol may also be fed directly to the converter via valve controlled line 26, and oxidized to methyl vinyl ketone under proper conditions. Slightly colored bodies in the methyl vinyl ketone-water azeotrope may be removed by washing with a 1% lime solution or by adding iron filings to the azeotrope. The wet methyl vinyl ketone may be conveniently dried by mixing with a volatile hydrocarbon solvent in drying unit 24, separating the organic layer, stripping off the solvent in still 28 and recovering relatively pure, dry methyl vinyl ketone. The methyl vinyl ketone may also be dried by the solid desiccant method given above. Other drying methods are also applicable.

*Example 2.*—A mixture of wet alcohols, as formed by hydrolysis and steam distillation in Example 1, is charged to a distilling column. The water azeotrope of methyl vinyl carbinol boiling at about 86.7° C. is removed first, and then the water azeotrope of crotyl alcohol boiling at about 90° C. is removed. The methyl vinyl carbinol-water azeotrope is dried, as in either the solid desiccant or organic solvent examples given above, and is then oxidized to methyl vinyl ketone as in Example 1. The wet crotyl alcohol may be isomerized to methyl vinyl carbinol, or utilized as a by-product.

*Example 3.*—The dry, substantially pure methyl vinyl carbinol as produced by Examples 1, 2 or 3 above is charged, in liquid state, to a converter utilizing a metallic copper-silver catalyst in a copper catalyst tube not having a bath for temperature control. In this case, temperature control is maintained by regulating the rate of admission of liquid methyl vinyl carbinol and unheated air. About 2.8 moles of methyl vinyl carbinol per hour and about 2.5 moles of air per hour were fed to the oxidation chamber. The liquid methyl vinyl carbinol is dropped onto the hot catalyst in the presence of the air stream. The methyl vinyl carbinol is vaporized and the air-methyl vinyl carbinol mixture is heated to reaction temperature by the heat of reaction, produced by the oxidation of methyl vinyl carbinol to methyl vinyl ketone. By carefully controlling feed and air rates so that a space velocity of about 6 volumes of vapor per volume of catalyst per hour is maintained, a reaction temperature of about 535° C. is produced, and gives yields of methyl vinyl ketone of about 92% of theory.

*Example 4.*—A mixture of 3-chloro-1-butene and 4-chloro-2-butene is hydrolyzed as in Example 1. The mixed alcohols are treated with an equal volume of benzene, and the water removed as the alcohol-benzene-water azeotrope boiling at about 72.8° C. Said alcohol-benzene-water azeotrope is allowed to stratify. The water layer, containing 6% to 7% methyl vinyl carbinol, is removed from the organic layer. The methyl vinyl carbinol is recovered from the water layer as the methyl vinyl carbinol-water azeotrope, which is recirculated to the drying unit. The removed organic layer containing substantially dry methyl vinyl carbinol-crotyl alcohol-benzene mixture is further distilled, benzene being first removed at 80° C. with any water, followed by a substantially pure, dry methyl vinyl carbinol at 96.7° C., and finally substantially pure, dry crotyl alcohol at 122.2° C. Said substantially pure, dry methyl vinyl carbinol is oxidized, using either the bath converter described in Example 1 or the vaporizing converter described in Example 4. The substantially pure, dry crotyl alcohol is utilized as described in examples above.

*Example 5.*—A mixture of 3-chloro-4-methyl-1-butene and 4-chloro-4-methyl-2-butene is hydrolyzed as in Example 1, and the hydrolysis mixture is steam distilled. The mixed wet alcohols are treated with about 1.5 pounds of sodium chloride per gallon of distillate and the mixture is allowed to stratify. The partially dried organic layer is removed and further dried with anhydrous potassium carbonate as in Example 1. The dry alcohols are charged to a still for separation. 3-hydroxy-4-methyl-1-butene (ethyl vinyl carbinol) is first removed at about 114° C., followed by 4-hydroxy-4-methyl-2-butene at about 122° C. The 4-hydroxy-4-methyl-2-butene may be recovered as a by-product as noted above. The ethyl vinyl carbinol is fed to an oxidation unit as in Example 1 and is oxidized to ethyl vinyl ketone. The crude ethyl vinyl ketone may be purified as outlined for methyl vinyl ketone, the pure product distilling at about 70° C. under 200 mm. pressure.

While the character of our invention and various specific examples have been given in detail, it is to be understood that the invention in its broader aspects is not limited thereto, but includes the production of alkyl vinyl ketones and other unsaturated ketones, by a process comprising hydrolyzing suitable beta-halo-olefins, separating a secondary hydroxy butene, and vapor phase oxidation of said secondary hydroxy butene to an unsaturated ketone.

By a beta-halo-butene, is meant an unsaturated halo compound with at least 4 carbon atoms per molecule and containing the groups:

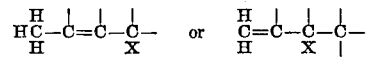

where X is a halogen group, which compound may be hydrolyzed to produce a substantial amount of secondary hydroxy butene, said secondary hydroxy butene being capable of oxidation to an unsaturated ketone.

It will be apparent to those skilled in the art that numerous variations and modifications of the disclosed examples may be effected, in the practice of the invention, which is of the scope of the appended claims.

We claim:

1. A process for the production of a vinyl ketone which comprises hydrolyzing a mixture of a normal 3 halo-1-butene and a normal 4-halo-2-butene and forming a mixture of unsaturated alcohols consisting essentially of a normal 4-hydroxy-2-butene and a normal 3-hydroxy-1-butene, recovering a mixture of said hydroxy butenes from the hydrolysis reaction mixture by fractionation, separating a 3-hydroxy-1-butene from said mixed hydroxy butene fraction, said 3-hydroxy-1-butene being readily isomerizable to a 4-hydroxy-2-butene, and converting said separated 3-hydroxy-1-butene to a vinyl ketone with minimized isomerization by vapor phase oxidation at a temperature of from 425° C. to 625° C. in the presence of from at least 90% to not more than 150% of the theoretical amount of oxygen required for said oxidation and by catalyzing said vapor phase oxidation with a catalyst selected from the group consisting of copper and silver oxidation catalysts.

2. A process as defined in claim 1 wherein said mixture of halo-butenes comprises 25% to 50% of 4-chloro-2-butene and 50% to 75% of 3-chloro-1-butene.

3. A process as defined in claim 1 wherein said mixture of halo-butenes is hydrolyzed with a lime slurry in water at a temperature of from about 65° C. to about 80° C.

4. A process as defined in claim 3 wherein said lime slurry contains 10% to 15% lime.

5. A process as defined in claim 1 wherein said vapor phase oxidation is at a temperature of from 500° C. to about 550° C.

6. A process as defined in claim 1 wherein said oxidation is effected in the presence of from 110% to 130% of the theoretical amount of oxygen required for said oxidation.

7. A process for the production of a vinyl ketone which comprises hydrolyzing a mixture of from 50% to 75% of a normal 3-chloro-1-butene and from 25% to 50% of a normal 4-chloro-2-butene and forming a mixture of unsaturated alcohols consisting essentially of a normal 4-hydroxy-2-butene and a normal 3-hydroxy-1-butene by contacting said mixture of chloro butenes with a lime slurry in water at refluxing temperature, recovering a mixture of said hydroxy butenes from the hydrolysis reaction mixture by fractionation, separating a 3-hydroxy-1-butene from said mixed hydroxy butene fraction, said 3-hydroxy-1-butene being readily isomerizable to a 4-hydroxy-2-butene and converting said separated 3-hydroxy-1-butene to a vinyl ketone with minimized isomerization by vapor phase oxidation at a temperature of from 500° C. to 550° C. in the presence of from about 110% to about 130% of the theoretical amount of oxygen required for said oxidation and by catalyzing said vapor phase oxidation with a catalyst selected from the group consisting of copper and silver oxidation catalysts.

8. A process as defined in claim 1 wherein said vapor phase oxidation comprises the step of vaporizing said 3-hydroxy-1-butene into the oxygen-containing gas in the presence of said oxidation catalyst.

9. A process as defined in claim 7 wherein said vapor phase oxidation comprises the step of vaporizing said 3-hydroxy-1-butene into the oxygen-containing gas in the presence of said oxidation catalyst.

IRVING E. LEVINE.
WILLIAM G. TOLAND, Jr.

REFERENCES CITED

The following references are of record in the file of this patent:

UNITED STATES PATENTS

| Number | Name | Date |
|---|---|---|
| 2,011,317 | Groll | Aug. 13, 1935 |

FOREIGN PATENTS

| Number | Country | Date |
|---|---|---|
| 424,659 | Great Britain | Feb. 26, 1935 |
| 436,840 | Great Britain | Oct. 18, 1935 |